(12) United States Patent
Chu et al.

(10) Patent No.: US 9,912,503 B2
(45) Date of Patent: Mar. 6, 2018

(54) BLUETOOTH SIGNAL RECEIVING METHOD AND DEVICE USING IMPROVED CARRIER FREQUENCY OFFSET COMPENSATION

(71) Applicant: ABOV SEMICONDUCTOR CO., LTD., Cheongju, Chungcheongbuk-Do (KR)

(72) Inventors: Sang Young Chu, Gyeonggi-do (KR); Ki Tae Moon, Seoul (KR); Suk Kyun Hong, Seoul (KR)

(73) Assignee: ABOV SEMICONDUCTOR CO., LTD., Cheongju, Chungcheongbuk-do (KR)

( * ) Notice: Subject to any disclaimer, the term of this patent is extended or adjusted under 35 U.S.C. 154(b) by 0 days.

(21) Appl. No.: 15/390,412

(22) Filed: Dec. 23, 2016

(65) Prior Publication Data

US 2017/0195151 A1 Jul. 6, 2017

(30) Foreign Application Priority Data

Dec. 30, 2015 (KR) .................. 10-2015-0189398

(51) Int. Cl.
*H04L 27/06* (2006.01)
*H04L 27/148* (2006.01)
(Continued)

(52) U.S. Cl.
CPC ............ *H04L 27/148* (2013.01); *H04L 27/22* (2013.01); *H04W 4/008* (2013.01)

(58) Field of Classification Search
CPC ......... H04L 27/10; H04L 27/02; H04L 27/14; H04L 25/4902; A61B 5/0002
(Continued)

(56) References Cited

U.S. PATENT DOCUMENTS 4,547,737 A * 10/1985 Gibson .................. H03D 3/006
329/343
4,912,422 A * 3/1990 Kobayashi .......... H04L 27/2332
329/306
(Continued)

FOREIGN PATENT DOCUMENTS

JP 2006-109476 A 4/2006
JP 4383445 B2 12/2009
(Continued)

*Primary Examiner* — James M Perez
(74) *Attorney, Agent, or Firm* — Mintz Levin Cohn Ferris Glovsky and Popeo, P.C.; Kongsik Kim; Colleen H. Witherell

(57) ABSTRACT

Disclosed herein are a Bluetooth signal receiving device and method. The Bluetooth signal receiving device includes a frequency shift demodulator circuit, a sampler circuit, a training bit pattern discriminator circuit, and a frequency offset compensation circuit. The frequency shift demodulator circuit generates a baseband signal by performing frequency shift demodulation on a received signal, and generates a frequency proportion signal having a value proportional to the frequency of the baseband signal. The sampler circuit generates a plurality of series of bit streams from the frequency proportion signal. The training bit pattern discriminator circuit determines whether the plurality of series of bit streams generated by the sampler circuit satisfies a training bit pattern condition. The frequency offset compensation circuit compensates the frequency proportion signal by using a measured error metric as a effective error metric when the plurality of series of bit streams satisfies the training bit pattern condition.

15 Claims, 12 Drawing Sheets

(51) Int. Cl.
*H04W 4/00* (2018.01)
*H04L 27/22* (2006.01)

(58) Field of Classification Search
USPC .............. 375/130–137, 259–285, 316–352
See application file for complete search history.

(56) References Cited

U.S. PATENT DOCUMENTS

| | | | | |
|---|---|---|---|---|
| 5,369,404 A * | 11/1994 | Galton | ............... | H03D 3/241 341/143 |
| 5,504,784 A * | 4/1996 | Niyogi | ............ | H03M 13/3723 375/323 |
| 5,668,678 A * | 9/1997 | Reed | ............... | G11B 5/59655 360/51 |
| 5,796,787 A * | 8/1998 | Chen | ............... | H04L 7/027 375/326 |
| 6,006,108 A * | 12/1999 | Black | ............... | H04B 1/406 455/553.1 |
| 6,023,386 A * | 2/2000 | Reed | ............... | G11B 5/09 360/46 |
| 6,266,003 B1 * | 7/2001 | Hoek | ............... | G10L 19/0212 341/155 |
| 6,456,950 B1 * | 9/2002 | El-Ghoroury | ......... | G01R 23/14 329/318 |
| 6,487,240 B1 * | 11/2002 | Chen | ............... | H04L 25/03178 329/318 |
| 6,642,797 B1 * | 11/2003 | Luo | ............... | H03J 7/045 329/300 |
| 6,643,336 B1 * | 11/2003 | Hsieh | ............... | H04L 7/042 370/206 |
| 6,751,273 B1 * | 6/2004 | Park | ............... | H04B 1/62 375/134 |
| 6,973,142 B2 * | 12/2005 | Chen | ............... | H04L 7/042 375/283 |
| 6,975,673 B1 * | 12/2005 | Rouquette | ............ | H04B 1/7102 375/145 |
| 7,376,207 B2 | 5/2008 | Chen | | |
| 7,457,350 B2 * | 11/2008 | Baker | ............... | H04B 1/71637 370/342 |
| 7,457,378 B1 * | 11/2008 | Sher | ............... | H04B 1/0014 375/340 |
| 7,570,717 B2 * | 8/2009 | Kim | ............... | H04L 27/066 375/326 |
| 7,639,762 B2 | 12/2009 | Weizhong | | |
| 7,646,831 B2 * | 1/2010 | Schetelig | ............... | H04L 7/042 370/203 |
| 7,664,205 B2 * | 2/2010 | Wang | ............... | H04L 27/14 329/300 |
| 7,953,192 B2 * | 5/2011 | Hong | ............... | H03G 3/3068 375/150 |
| 8,023,575 B2 * | 9/2011 | Jones | ............... | H04L 27/2647 370/210 |
| 8,121,214 B2 * | 2/2012 | Tal | ............... | H03B 21/02 370/206 |
| 8,325,865 B1 * | 12/2012 | Rofougaran | ............ | H04B 1/001 375/316 |
| 8,401,120 B1 * | 3/2013 | Ozgur | ............... | H04L 1/00 375/329 |
| 8,406,275 B2 * | 3/2013 | Sforza | ............... | H04B 1/69 375/139 |
| 8,411,797 B2 * | 4/2013 | Suissa | ............... | H04L 27/14 375/319 |
| 8,478,136 B2 * | 7/2013 | Hayee | ............... | H04B 10/2543 398/208 |
| 8,494,102 B2 * | 7/2013 | Chen | ............... | H04L 25/0226 375/324 |
| 8,555,767 B2 * | 10/2013 | Ahn | ............... | F41A 9/60 89/33.4 |
| 8,710,939 B2 * | 4/2014 | Kim | ............... | H03K 3/011 331/176 |
| 8,903,023 B1 * | 12/2014 | Wang | ............... | H04L 27/142 375/224 |
| 8,948,279 B2 * | 2/2015 | Volpi | ............... | G06K 7/0008 340/10.1 |
| 9,473,186 B2 * | 10/2016 | Song | ............... | H03F 3/189 |
| 2002/0122511 A1 * | 9/2002 | Kwentus | ............... | H04L 1/0045 375/343 |
| 2003/0016770 A1 * | 1/2003 | Trans | ............... | H04B 1/00 375/346 |
| 2004/0002313 A1 * | 1/2004 | Peace | ............... | H03G 3/3089 455/234.1 |
| 2004/0146091 A1 * | 7/2004 | Chang | ............... | H04B 1/70755 375/147 |
| 2004/0184564 A1 * | 9/2004 | Chen | ............... | H04L 7/042 375/330 |
| 2005/0031021 A1 * | 2/2005 | Baker | ............... | H04B 1/71637 375/142 |
| 2005/0078734 A1 * | 4/2005 | Baker | ............... | H04B 1/71637 375/130 |
| 2005/0207519 A1 * | 9/2005 | Phang | ............... | H04L 27/2278 375/354 |
| 2006/0274862 A1 * | 12/2006 | Lui | ............... | H04L 1/0054 375/341 |
| 2007/0248195 A1 * | 10/2007 | Lerner | ............... | H04L 7/042 375/343 |
| 2008/0187078 A1 * | 8/2008 | Hong | ............... | H03G 3/3068 375/350 |
| 2009/0176466 A1 * | 7/2009 | Hellberg | ............ | H03H 17/0018 455/127.1 |
| 2009/0279588 A1 * | 11/2009 | Mochizuki | ............ | H04B 1/713 375/137 |
| 2010/0029347 A1 * | 2/2010 | Hellberg | ............ | H04L 27/2614 455/574 |
| 2010/0310009 A1 * | 12/2010 | Lakkis | ............... | H04J 13/0014 375/308 |
| 2013/0160637 A1 * | 6/2013 | Ahn | ............... | F41A 9/60 89/33.4 |
| 2013/0272722 A1 | 10/2013 | Hayee et al. | | |
| 2014/0177764 A1 * | 6/2014 | Tetzlaff | ............... | H04L 27/06 375/343 |
| 2015/0111513 A1 * | 4/2015 | Song | ............... | H03F 3/189 455/251.1 |
| 2015/0222419 A1 * | 8/2015 | Bachmann | ............... | H03L 7/08 375/327 |
| 2015/0280841 A1 * | 10/2015 | Gudovskiy | ............ | H04B 17/20 375/226 |
| 2016/0197665 A1 * | 7/2016 | Moshfeghi | ............ | H04W 88/06 375/267 |
| 2017/0141736 A1 * | 5/2017 | Pratt | ............... | H03F 3/21 |
| 2017/0194925 A1 * | 7/2017 | Moon | ............... | H03G 3/3078 |
| 2017/0195149 A1 * | 7/2017 | Moon | ............... | H04L 27/14 |
| 2017/0195150 A1 * | 7/2017 | Chu | ............... | H04B 7/26 |
| 2017/0195152 A1 * | 7/2017 | Chu | ............... | H04L 27/148 |

FOREIGN PATENT DOCUMENTS

| | | |
|---|---|---|
| JP | 2011-166209 A | 8/2011 |
| JP | 5454181 B2 | 3/2014 |
| KR | 10-2001-0100573 A | 11/2001 |
| KR | 10-0339661 B1 | 5/2002 |
| KR | 10-0525002 B1 | 10/2005 |
| KR | 10-0544245 B1 | 1/2006 |
| KR | 10-2010-0035726 A | 4/2010 |
| KR | 10-1000861 B1 | 12/2010 |
| KR | 10-1026407 B1 | 4/2011 |

* cited by examiner

BLUETOOTH SIGNAL RECEIVING METHOD AND DEVICE USING IMPROVED CARRIER FREQUENCY OFFSET COMPENSATION

CROSS-REFERENCE TO RELATED APPLICATION

This application claims under 35 U.S.C. § 119(a) the benefit of Korean Patent Application No. 10-2015-0189398 filed on Dec. 30, 2015, which is incorporated herein by reference.

TECHNICAL FIELD

The present invention relates to technology for a carrier frequency offset compensation method for a Bluetooth Smart receiving device, and more particularly to a method of compensating for the offset of a carrier frequency by applying a selective bit stream decision-oriented technique in a Bluetooth Smart device, and a circuit to which the method is applied.

The present invention was derived from the research conducted as a part of the Industrial Core Technology Development Project sponsored by the Korean Ministry of Trade, Industry and Energy and the Korea Institute of Industrial Technology Evaluation and Planning [Project Management Number: 10052626; Project Name: Development of BLE (Bluetooth Low-Energy) v4.2 Supporting Communication Semiconductor IP and Location Tracking SoC].

BACKGROUND ART

The configuration of a typical Bluetooth receiver is introduced in FIG. 1. Referring to FIG. 1, the Bluetooth receiver includes a front-end circuit 110 configured to obtain a baseband signal by demodulating a received signal, a filter 120 configured to selectively pass a desired channel therethrough and remove an undesired channel, and a recovery circuit 130 configured to convert the received baseband signal in the frequency domain into time domain symbols.

A Bluetooth transmitter generates a carrier frequency-based modulated signal by modulating a baseband signal. A Bluetooth Smart transmitter uses a Gaussian frequency shift keying modulation method that has a modulation index h ranging from 0.45 to 0.55. The frequency shift keying method refers to a method of transmitting digital information through the variation of the discrete frequency of a carrier.

FIG. 11 is a diagram showing the frequency characteristic of a modulated signal that is transmitted by a Bluetooth transmitter in an ideal environment in which noise and frequency offset are not present. Referring to FIG. 11, there are shown the minimum and maximum frequency shifts of a signal having a symbol transmission speed Fs of 1 Msps and a modulation index h of 0.5 that is transmitted via a carrier frequency Fc in the 2.4 GHz band. When the symbol transmission speed Fs is 1 Msps, the signal of the bit value "1" corresponding to the symbol "+1" has a frequency shift $F_+$ of +250 kHz (a frequency shift in a positive (+) direction) from a center frequency Fc, the signal of the bit value "0" corresponding to the symbol "−1" has a frequency shift $F_-$ of −250 kHz (a frequency shift in a negative (−) direction) from the center frequency Fc.

Referring back to FIG. 1, the front-end circuit 110 of the Bluetooth Smart receiver obtains a frequency-demodulated waveform in a baseband by using an analog or digital frequency demodulator, and estimates transmission bit information by deciding signs at symbol intervals.

Since a signal is received in the state in which the quality thereof has been degraded due to signal magnitude offset, carrier offset, timing offset, etc. attributable to mismatch between a transmitter and the receiver, the receiver must be prepared for errorless bit demodulation by implementing a recoverer for corresponding offset. In particular, when carrier offset is generated, a frequency-demodulated waveform in a baseband exhibits the state in which the average value of frequency shifts is not zero and is biased by a constant value corresponding to the magnitude of the carrier offset.

FIG. 2 is a diagram showing a typical packet of Bluetooth Smart. Referring to FIG. 2, the packet of Bluetooth Smart includes a preamble interval 210, an access address interval 220, a protocol data unit (PDU) interval 230, and a CRC interval 240. Since a Bluetooth receiver must identify an address during the access address interval 220 and must identify and process data during the PDU interval 230, preparation for the identification of the address and the data must be completed during the preamble interval 210. Accordingly, there is a time limitation in that operations, such as automatic gain control, frequency offset compensation, timing compensation, etc., must be performed within a preamble interval of Bluetooth or Bluetooth Smart in the front-end circuit 110 of the Bluetooth receiver.

For a receiver to estimate offset, a previously agreed upon pilot signal is required between a transmitter and the receiver. According to the Bluetooth Smart standard, a bit stream corresponding to the start of a packet is transmitted in the preamble interval 210. The bit stream of the preamble interval 210 is determined by the first transmission bit of the access address interval 220. When the first transmission bit of the access address interval 220 is "1," the bit stream value "01010101b" of the preamble interval 210 is transmitted. When the first transmission bit of the access address interval 220 "0," the bit stream value "10101010b" of the preamble interval 210 is transmitted. Since the frequency-demodulated waveform of the preamble interval 210 has a sine wave-like form in which negative (−) and positive (+) frequency shifts are repeated, it has the characteristic of a pilot signal appropriate for the estimation of carrier offset using a "minimum-maximum average value" scheme.

An example of a preceding technology for compensating for the frequency offset of a received signal in a Bluetooth receiver is disclosed in U.S. Pat. No. 6,642,797 entitled "Normalization Methods for Automatic Frequency Compensation in Bluetooth Applications."

FIG. 3 is a circuit diagram showing a circuit for compensating for frequency offset according to the preceding technology. Referring to FIG. 3, the circuit for compensating for frequency offset includes an analog-to-digital converter 310, a low-frequency pass filter 320, a frequency demodulator 330, a digital peak detector 340, and an offset normalizer 350. The preceding technology is a technology for correcting or compensating for frequency offset during the preamble interval 210, having a setting similar to that of FIG. 2, for each signal packet.

The preceding technology is configured such that the digital peak detector 340 detects an average frequency by means of a minimum-maximum average value by detecting the maximum positive and negative peaks of a frequency component and estimates offset by calculating the difference between the average frequency and a preset carrier frequency, and the offset normalizer 350 compensates for the difference.

Since the preamble 210 is an agreed upon bit pattern in which a negative (−) frequency shift and a positive (+) frequency shift appear symmetrically, all offset other than zero is made to pertain to frequency offset by applying a "minimum-maximum" average value. However, since a bit pattern has a random characteristic in the user data intervals 220 and 230, a negative (−) frequency shift and a positive (+) frequency shift do not appear symmetrically and unspecific offset attributable to asymmetry is mixed with a frequency offset component, and thus a disadvantage arises in that the validity of a frequency offset estimation method using an instantaneously obtained "minimum-maximum" average value for the preamble interval 210 is poor.

A preceding technology using a method of predicting the tendency of changes in offset and performing feed-forwarding so that the offset estimated in the preamble interval 210 can be used in the user data intervals (the access address interval 220 and the protocol data unit interval 230) is disclosed in U.S. Pat. No. 8,411,797 entitled "Frequency Offset Compensation in a Digital Frequency Shift Keying Receiver."

The second preceding technology employs a statistical "minimum-maximum" average value scheme in order to overcome the disadvantage of the method of estimating frequency offset using an instantaneous "minimum-maximum" average value in the random data intervals 220 and 230. That is, a statistical characteristic is used in which an instantaneous value has low accuracy due to offset attributable to data but maximum positive and negative peaks converge to a symmetrically uniform value when observed over a long period of time. The maximum positive and negative peaks are obtained using a moving average or sliding average method, the randomness effect of data is removed, and the tendency of minute changes in frequency offset is tracked using the intermediate value of the two peaks. Although frequency offset may be estimated in the access address interval 220 and the protocol data unit interval 230 by using the above method, the method is Useful in a desirable received signal region having a value equal to or higher than −90 dBm in which the magnitude of white noise is relatively low because there is a risk that an estimated error may be amplified when white noise is added to an environment where the randomness of data is present.

In a current situation in which a demand for a high-sensitivity receiver supporting a value equal to or lower than −90 dBm is increasing, it is difficult to perform sufficient offset compensation on a Bluetooth Smart signal by using the conventional preceding technologies. Therefore, there is an increasing need for a means that is capable of dealing with this situation.

SUMMARY OF THE DISCLOSURE

The present invention relates to technology for a method of compensating for frequency offset in a Bluetooth Smart receiving device. An object of the present invention is to provide a device and method for continuously tracking frequency offset, rather than estimating frequency offset once.

Since the receiving sensitivity defined in the Bluetooth Smart standard is merely −70 dBm and the signal to noise power ratio in a corresponding signal magnitude region corresponds to 30 dB or more, a noise component is substantially insignificant. Accordingly, the estimated value of carrier offset obtained in a preamble interval by applying a "minimum-maximum average value" scheme has considerably high accuracy. However, since a demand for a high-sensitivity receiver equal to or lower than −90 dBm is increasing in line with the development of implementation technology and the received signal to noise power ratio in a corresponding signal magnitude region is decreased to 10 dB or less, the reliability of the estimated value of carrier offset measured in the preamble interval is considerably poor due to the magnitude of relatively increased noise. Accordingly, there is a need for a device for continuously tracking carrier offset also in access address and protocol data unit intervals while reducing the magnitude of estimation jitter by means of an averaging effect, rather than performing the recovery of a carrier through only single acquisition in a preamble interval.

A Gaussian frequency shift keying method refers to a method of applying a Gaussian filter to a bit stream in order to increase spectrum efficiency. In this method, inter-symbol interference occurs in a filtering process, and thus a signal waveform is distorted. For example, when the above-described magnitude of a minimum/maximum frequency shift in the preamble interval is actually measured, the magnitude is about 220 kHz that is lower than 250 kHz defined in a modulation index. The preamble interval is a combination of bits in which a negative (−) frequency shift and a positive (+) frequency shift appear symmetrically, and thus there is no problem in applying the "minimum-maximum average value" scheme. In the randomly generated access address and protocol data unit intervals, a negative (−) frequency shift and a positive (+) frequency shift do not appear symmetrically due to inter-symbol interference. Accordingly, when a typical "minimum-maximum average value" scheme is applied to tracking, great error occurs, and thus expected performance cannot be achieved.

Since Bluetooth Smart prioritizes costs and low power, it allows frequency drift within the maximum range of +/−50 kHz in a packet in a period of 625 Hz in order to ease the level of analog circuit design specifications. A high-sensitivity receiver requires a device for continuously tracking and removing carrier offset drifting in the access address interval 220 and the protocol data unit interval in order to reduce data loss rate.

Carrier offset recovery includes two steps of performing acquisition in the preamble interval of an agreed upon pattern and then performing tracking in the data signal intervals to deal with the averaging effect of noise and frequency drift. The acquisition step employs the "minimum-maximum average value" scheme within the preamble interval, and the tracking step employs a sliding averaging method for minimum and maximum values or a method of periodically applying a "minimum-maximum average value" in sliding window intervals in the data intervals. However, although any method is selected in the tracking step, a certain level of estimation error must be endured due to a frequency shift asymmetry phenomenon in negative (−) and positive (+) directions attributable to the randomness of data and inter-symbol interference.

A non-data aided (NDA) prediction technique using roughly estimated values for unspecified data is disadvantageous in that high jitter occurs. An attempt is made to implement a structure for reducing jitter by using a loop filter in order to mitigate the above disadvantage. In packet communication in which burst transmission is performed at short time intervals, a problem arises in that self noise generated during training time directly degrades system performance, unlike in circuitry communication in which the training time taken for convergence does not cause a problem.

Accordingly, the present invention is intended to provide a device and method for implementing a high-sensitivity receiver that is capable of overcoming structural problems (high jitter and a long training period) and a performance problem that occur when implementation is performed using the conventional NDA prediction technique. For this purpose, an object of the present invention is to provide a device and method for acquiring and tracking carrier frequency offset by using a "selective bit stream decision-directed" technique.

That is, an object of the present invention is to provide a device and method capable of dynamically tracking randomly generated frequency offset by acquiring frequency offset in the preamble interval of a Bluetooth Smart packet and tracking the frequency offset in the access address interval and protocol data unit interval thereof.

According to an aspect of the present invention, there is provided a Bluetooth signal receiving device, including a frequency shift demodulator circuit configured to generate a baseband signal by performing frequency shift demodulation on a received signal, and to generate a frequency proportion signal having a value proportional to the frequency of the baseband signal; a sampler circuit configured to generate a plurality of series of bit streams, sampled at a preset time interval, from the frequency proportion signal; a training bit pattern discriminator circuit configured to determine whether the plurality of series of bit streams generated by the sampler circuit satisfies a training bit pattern condition (1010b, 0101b, 111000b, 000111b, or the like); and a frequency offset compensation circuit configured to compensate the frequency proportion signal by using a measured error metric as an effective error metric when the plurality of series of bit streams satisfies the training bit pattern condition.

The training bit pattern condition may be set by applying a selective bit stream decision-directed technique. The training bit pattern condition may be adapted to select a bit stream having a distribution in which a negative direction frequency shift and a positive direction frequency shift are complementary to each other from among the plurality of series of bit streams.

The frequency offset compensation circuit may be further configured to measure the error metric by applying a minimum-maximum average technique to the plurality of series of bit streams. The frequency offset compensation circuit may be further configured to select a representative frequency shift when frequency shifts having the same polarity appear successively in the plurality of series of bit streams, and to measure the error metric by applying the minimum-maximum average technique to the representative frequency shift. For example, when the pattern "000111b" or "111000b" is found in the series of bit streams, a representative frequency shift may be selected from the pattern "000b" and a representative frequency shift may be selected from the pattern "111b," and the minimum-maximum average technique may be applied based on the representative frequency shifts.

The frequency offset compensation circuit may be further configured to, when the plurality of series of bit streams satisfies the training bit pattern condition a plurality of times within a first time interval (which refers to a predetermined time range, and which may correspond to a case where a training bit pattern is repeated, such as a preamble interval), calculate the first representative value (the average, the moving average, the weighted moving average, or the like) of a plurality of effective error metrics within the first time interval and compensate the frequency proportion signal by using the first representative value. That is, when a training bit pattern appears a plurality of times within a adjacent period, the tendency of changes in offset may be tracked through the statistical processing of effective error metrics obtained from bit streams satisfying the training bit pattern condition. Examples of the statistical processing are an average technique, a sliding moving average technique, a weighted moving average technique, etc. A technique for tracking the tendency of changes in offset, such as the sliding moving average technique, may effectively extract changes in offset from bit streams present within an adjacent period, and the range of application thereof may be limited to the range of a second time interval (which is longer than the first time interval, and has a finite value) or the range of a corresponding packet.

The training bit pattern discriminator circuit may be further configured to determine whether the plurality of series of bit streams satisfies the training bit pattern condition not only in a preamble interval of Bluetooth but also in an access address or protocol data unit interval thereof.

The Bluetooth signal receiving device may further include memory (FIFO memory) configured to accumulate the plurality of series of bit streams, generated by the sampler, up to a preset number and to store the accumulated plurality of series of bit streams, and the training bit pattern discriminator circuit may be further configured to determine whether the plurality of series of bit streams accumulated up to the preset number and stored in the memory satisfies the training bit pattern condition.

When the received signal is a signal transmitted through a Gaussian filter, the maximum length of the training bit pattern condition may be determined in accordance with the bandwidth or length of the Gaussian filter. The characteristic of inter-symbol interference is determined in accordance with the length of a Gaussian filter. Since a Gaussian filter having a BT of 0.5 defined in the Bluetooth Smart standard has the characteristic in which 99.999% or more of energy is concentrated within 3 symbols, 3 bits centered on a current bit determine a current frequency shift waveform. In this case, the bandwidth of the Gaussian filter is 3, and thus the training bit pattern condition may be set within 3 bits.

According to another aspect of the present invention, there is provided a Bluetooth signal receiving method including: generating a baseband signal by performing frequency shift demodulation on a received signal; generating a frequency proportion signal having a value proportional to a frequency of the baseband signal; generating a plurality of series of bit streams, sampled at a preset time interval, from the frequency proportion signal; determining whether the plurality of series of bit streams generated by the sampler circuit satisfies a training bit pattern condition; and compensating the frequency proportion signal by using a measured error metric as an effective error metric when the plurality of series of bit streams satisfies the training bit pattern condition.

The determining may include determining whether the plurality of series of bit streams satisfies the training bit pattern condition not only in a preamble interval of Bluetooth but also in an access address or protocol data unit interval.

The Bluetooth signal receiving method may further include accumulating the plurality of series of bit streams, generated by the sampler, up to a preset number, and storing the accumulated plurality of series of bit streams, and the determining may include determining whether the plurality of series of bit streams accumulated up to the preset number and then stored satisfies the training bit pattern condition.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Embodiments of the present invention will be described in detail with reference to the accompanying drawings. In the following description of the present invention, a detailed description of a related well-known component or function will be omitted when it is determined that the detailed description may make the gist of the present invention obscure.

The prevent invention is not limited to the embodiments. Throughout the accompanying drawings, the same reference symbols designate the same components.

Figure 1:
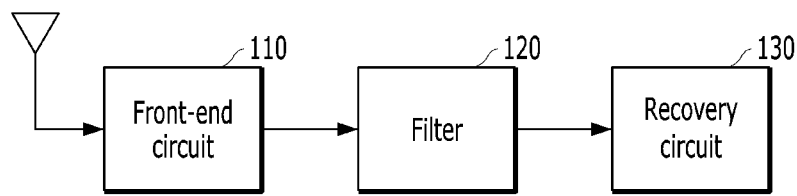
FIG. 1 is a block diagram showing the configuration of a typical Bluetooth receiver.
Figure 2:
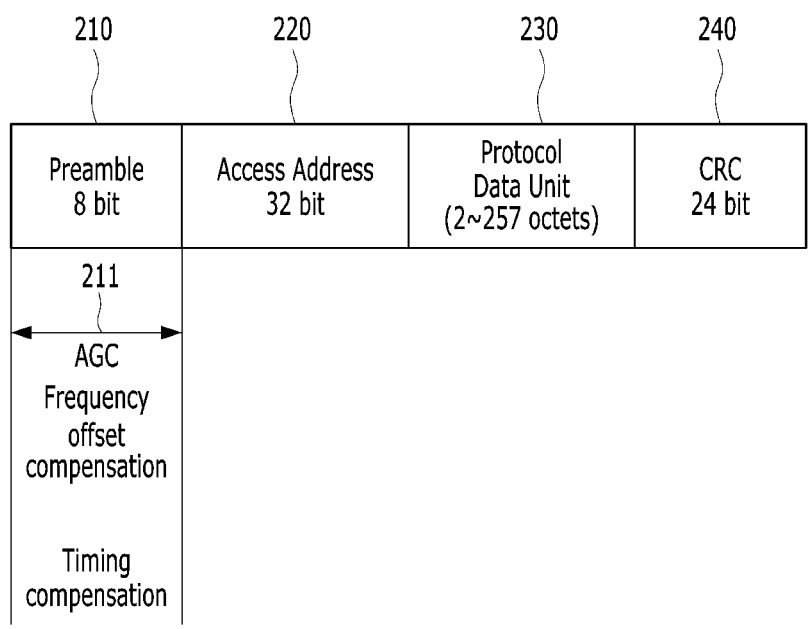
FIG. 2 is a diagram showing a typical packet of Bluetooth Smart.
Figure 3:
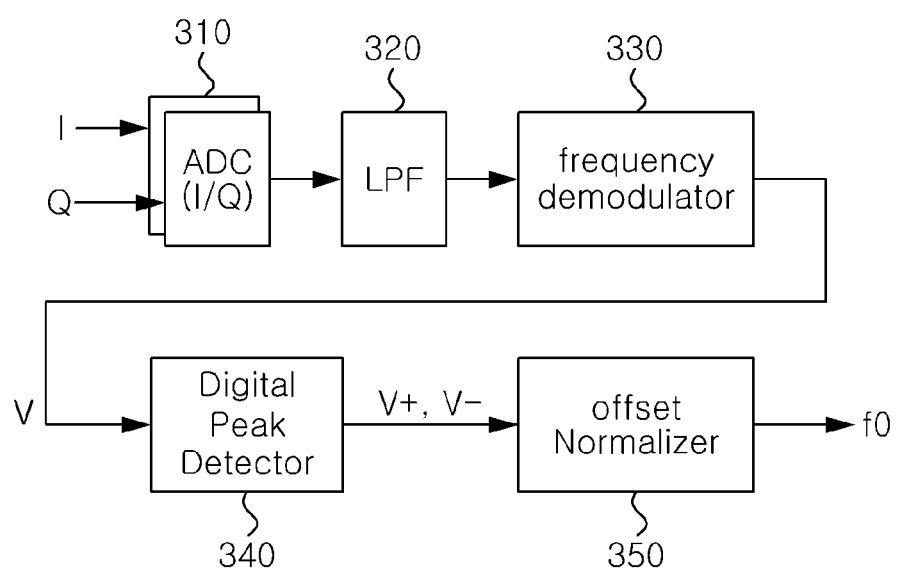
FIG. 3 is a diagram showing an example of the front-end circuit of a conventional Bluetooth signal receiving device.
Figure 4:
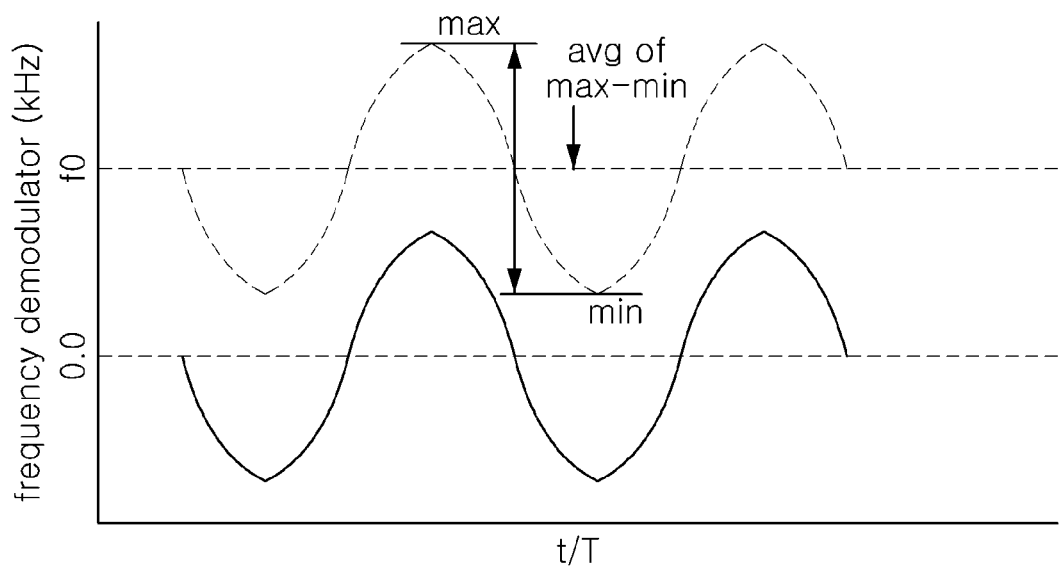
FIG. 4 is a diagram showing waveforms having passed through the frequency demodulator of a receiver and a "minimum-maximum average value" carrier offset estimation method.

FIG. 4 is a diagram showing waveforms having passed through the frequency demodulator of a receiver and a "minimum-maximum average value" carrier offset estimation method.

When carrier offset occurs, a baseband frequency-demodulated waveform shows the state in which the average value of frequency shifts is not zero but has been biased by a constant value corresponding to the magnitude of the carrier offset. In this case, the constant value of the biased offset is illustrated as f0 in FIG. 4.

Figure 11:
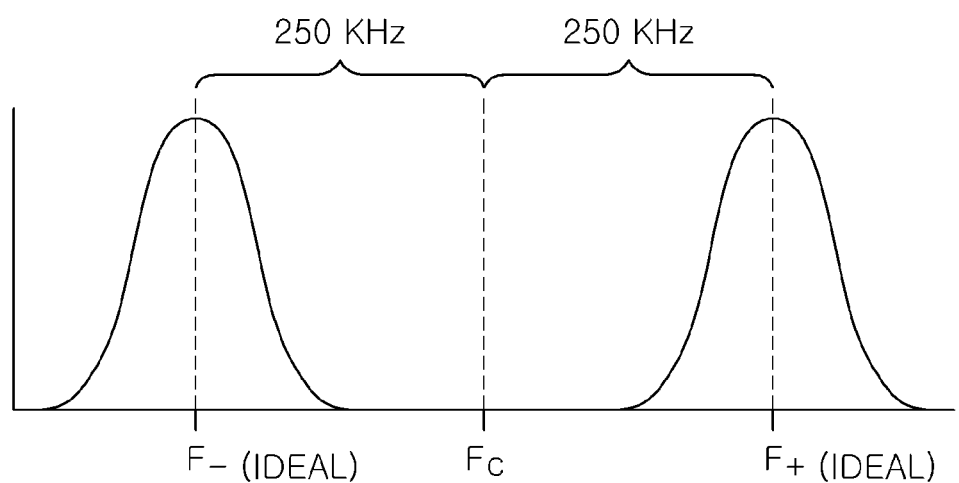
FIG. 11 is a diagram showing the frequency characteristic of a modulated signal that is transmitted by a Bluetooth transmitter in an ideal environment in which noise and frequency offset are not present.

For example, assuming that the carrier offset f0 is +50 kHz, minimum and maximum frequency shifts observed in the baseband of the receiver come to have values of −200 kHz and +300 kHz that are biased from values of −250 kHz and +250 kHz, described in conjunction with the ideal environment of FIG. 11, by +50 kHz. The receiver performs carrier offset compensation by using a method of removing the magnitude of the bias.

Referring to FIG. 4, the offset f0 may be determined by measuring the maximum frequency shift value of the baseband signal and the minimum frequency shift value thereof and calculating a "minimum-maximum average value."

In a frequency shift keying communication system, in order to estimate the carrier offset, on the assumption that in a normal environment, a maximum frequency shift and a minimum frequency shift appear symmetrical and an average value is zero, a receiver calculates a minimum-maximum average value, estimates the minimum-maximum average value to be carrier offset, and removes the carrier offset.

Figure 5:
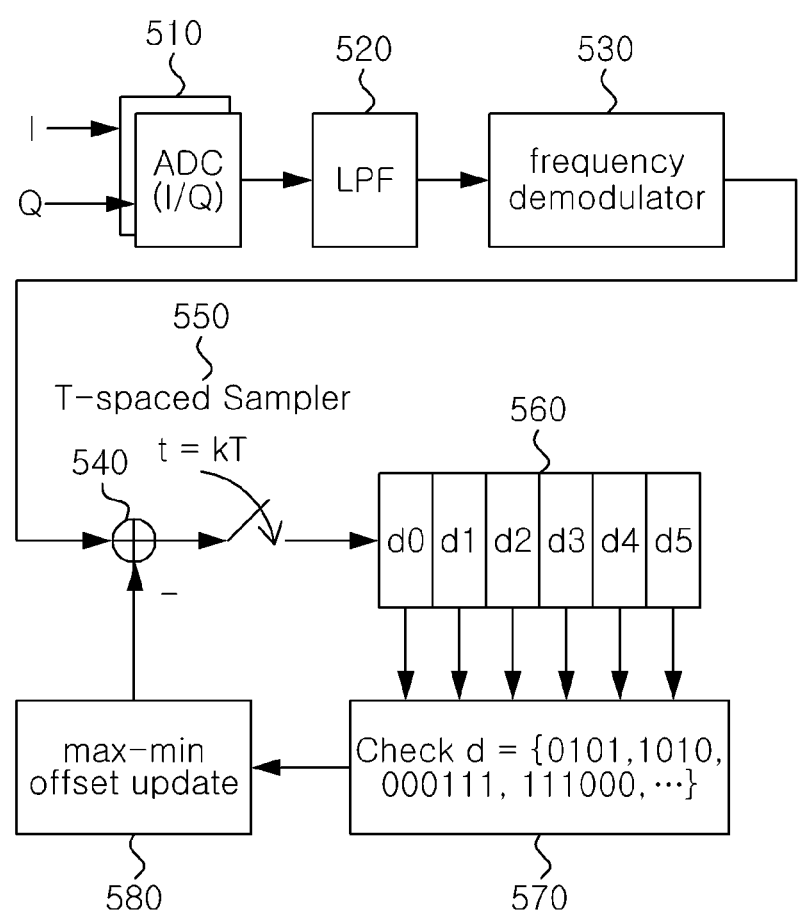
FIG. 5 is a diagram showing a circuit for performing frequency offset compensation in a Bluetooth signal receiving device according to an embodiment of the present invention.

FIG. 5 is a diagram showing a circuit for performing frequency offset compensation in a Bluetooth signal receiving device according to an embodiment of the present invention.

Referring to FIG. 5, there is shown an ADC pair 510 configured to receive an I signal and a Q signal and convert an analog value into a digital value. The output of the ADC pair 510 passes through a low frequency pass filter 520, and thus a high frequency noise component is removed. For example, the low frequency pass filter 520 may receive and process a 4-sample interval signal for each symbol.

A waveform having passed through a frequency shift demodulator 530 exhibits the characteristic of a waveform that frequency-shifts within the maximum range of +/−250 kHz. The frequency shift demodulator 530 generates a frequency proportion signal having a value proportional to the frequency of a baseband signal. In this case, an offset compensation value provided by the compensation circuit 540 may be added to the frequency proportion signal. A signal that is transferred to a discrete time sampler 550 by the compensation circuit 540 is proportional to frequency, is also subjected to subtraction based on the center frequency of a carrier in the state in which the offset has been compensated for, and thus has a +/− sign and a difference with a center frequency as a value.

The discrete time sampler 550 identifies bits by using the signs of the signal at symbol intervals. The discrete time sampler 550 generates a bit stream identified from the frequency proportion signal at symbol intervals. The identified bits are sequentially stored in memory 560. The memory 560 sequentially stores bits identified within a recent predetermined time interval. The memory 560 may operate in a First-In First-Out (FIFO) manner. The memory 560 may store a number of identified bits equal to a predetermined number, and may evict the oldest bit when storing a new bit.

A training bit pattern discriminator circuit 570 determines whether a plurality of series of bit streams generated from the sampler circuit 550 satisfies a training bit pattern condition. The training bit pattern discriminator circuit 570 may determine whether a bit stream satisfying the training bit pattern condition is present among a plurality of series of bit streams stored in the memory 560. When the stored or generated bit stream satisfies the "training bit pattern condition," the minimum-maximum offset estimator 580 selectively incorporates each bit stream, satisfying the bit pattern condition, into the acquisition and tracking of carrier frequency offset by using the "minimum-maximum average value method."

The carrier frequency offset value obtained by the offset estimator 580 is compensated for by the compensation circuit 540 for the frequency proportion signal.

In Gaussian frequency shift keying communication, inter-symbol interference is generated by the Gaussian filtering of a bit stream, and minimum and maximum frequency shifts do not appear symmetrical to each other in a random data pattern. Accordingly, a problem arises in that although a carrier offset is not present, a "minimum-maximum average value" is not zero, and acquisition and tracking performance robust to relatively high noise is required to implement a high-sensitivity receiver. The conventional NDA prediction technique uses a loop filter in order to reduce high jitter occurring in the condition. Bit error occurring during training time has a harmful influence on packet communication.

The output of the frequency shift demodulator 530 has a waveform that is biased to a negative (−) or positive (+) frequency depending on the information of a bit. When only the segment of a waveform having symmetry is selected as an effective error metric and then used for tracking, estimation robust to inter-symbol interference can be performed.

The characteristic of the inter-symbol interference is determined in accordance with the length of a Gaussian filter. Since a Gaussian filter having a BT of 0.5 defined in the Bluetooth Smart standard has the characteristic in which 99.999% or more of energy is concentrated within 3 symbols, 3 bits centered on a current bit determine a current frequency shift waveform. For example, assuming that the bit stream "101b" has been transmitted by a transmitter, a segment in which a minimum frequency shift is performed toward a negative (−) direction at a central bit location is output. Assuming that the complementary bit stream "010b" has been transmitted, a segment in which maximum frequency shift is performed toward a positive (+) direction at a central bit location is output. Although minimum and maximum magnitudes cannot be accurately determined due to inter-symbol interference, two bits are complementary to each other and thus have symmetry in which signs are different but magnitudes are the same, which is a case that is appropriate for the application of the "minimum-maximum average value" scheme to carrier offset estimation. Although an embodiment in which a training bit pattern condition is obtained using a 3-symbol Gaussian filter has been illustrated as an example, the number of symbols may be determined based on a symbol interval, which is significant in terms of probability or in which a predetermined percentage or more of energy is concentrated, by considering a transmission/receiving environment or the configuration of a circuit according to another embodiment of the present invention.

Since the characteristic of a signal vary over time, measurement points must be adjacent to each other in order to apply the "minimum-maximum average value" scheme. For example, assuming that the bit stream "1010b" obtained by combining the above-described two bit streams has been transmitted, a minimum frequency shift occurs at a second bit location and a symmetrical maximum frequency shift occurs at a temporally immediate third bit location, which is considerably appropriate for the application of the "minimum-maximum average value" scheme.

In sum, a bit stream in which a frequency shift in a negative (−) direction and a positive frequency shift in a (+) direction are repeated in a symmetrical form is defined as a "training bit pattern," and the "training bit pattern" is selectively used for the acquisition and tracking of carrier offset. Examples of representative "training bit patterns" are 0101b, 1010b, 000111b, and 111000b.

In this case, when the bit stream "000111b" is taken as an example, a group of bits determining a minimum frequency shift is "000b" and a group of bits determining a maximum frequency shift is "111b," and thus the minimum frequency shift appears at a second bit (the center bit "0" of "000b") and the symmetrical maximum frequency shift appears at a fifth bit (the center bit "1" of "111b"). In this case, a representative frequency shift may be selected by selecting representative bits, in which a maximum/minimum frequency shift appears, in a group of bits in which frequency shifts having the same polarity appear successively. In the following process, a "minimum-maximum average value" may be estimated based on the representative frequency shifts, and may be used for the acquisition and track tracking of initial offset.

Figure 6:
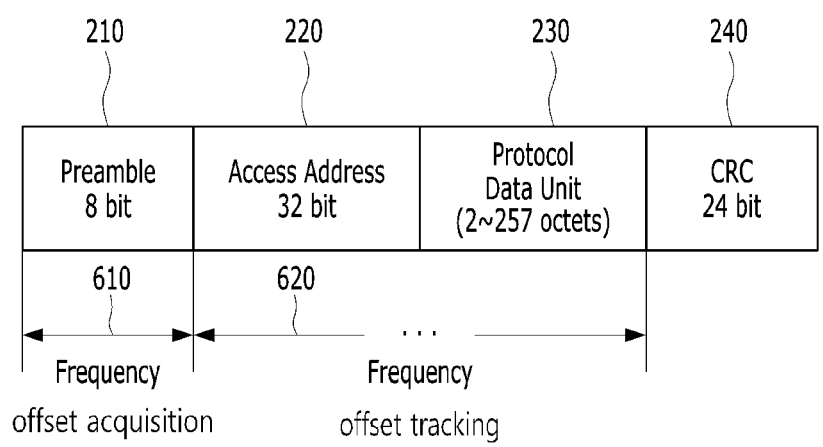
FIG. 6 is a diagram showing a process of acquiring and tracking frequency offset in a packet of Bluetooth Smart according to an embodiment of the present invention.

FIG. 6 is a diagram showing a process of acquiring and tracking frequency offset in a packet of Bluetooth Smart according to an embodiment of the present invention. 1 bit of the packet of Bluetooth Smart corresponds to a time interval of 1 μs.

Referring to FIG. 6, in the packet of Bluetooth Smart, a preamble interval 210 of 8 μs and an access address interval 220 of 32 μs are present. The Bluetooth signal receiving device of the present invention may acquire carrier frequency offset by using the selective bit stream decision-oriented technique within the preamble interval 210 of 8 μs at step 610, and may track the frequency offset during the access address interval 220 of 32 μs and the following protocol data unit interval 230 at step 620.

Since there is no guarantee that the carrier frequency offset initially obtained within the preamble interval 210 at step 610 is maintained in the access address interval 220 and the protocol data unit interval 230 without change, the Bluetooth signal receiving device of the present invention may track a change in a transmission/receiving environment or a change in offset within a modulation index range in the access address interval 220 and the protocol data unit interval 230 at step 620.

Figure 7:
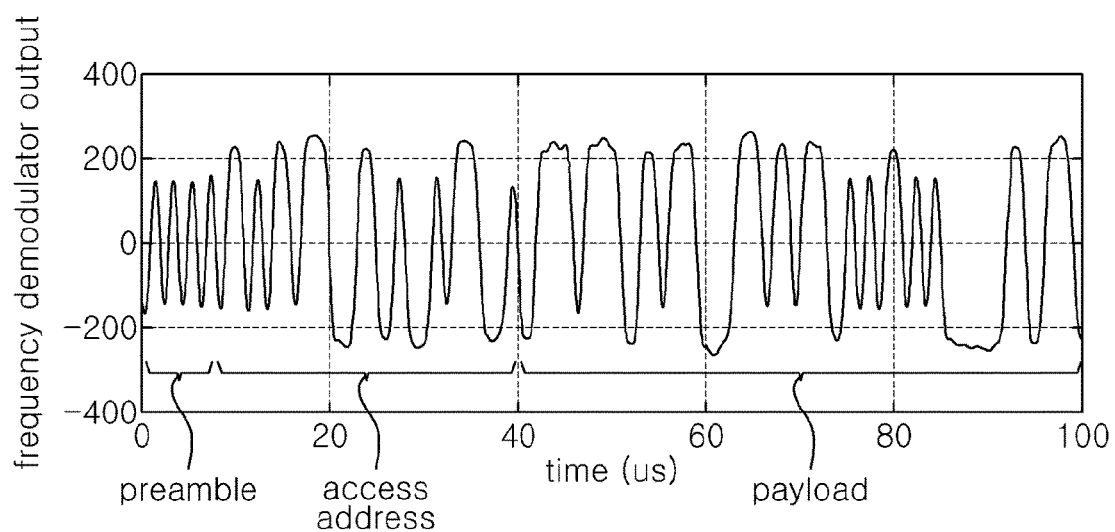
FIG. 7 shows an example of a waveform obtained after a Bluetooth Smart packet signal has passed through the frequency demodulator of a receiver in an ideal environment in which noise and frequency offset are not present.

FIG. 7 shows an example of a waveform obtained after a Bluetooth Smart packet signal has passed through the frequency demodulator of a receiver in an ideal environment in which noise and frequency offset are not present.

Referring to FIG. 7, a preamble is received during first 8 μs, an access address is received during the following 32 μs, and then a protocol data unit is received. To help to understand the operation of the Bluetooth signal receiving device of the present invention, a waveform received by a receiver after the waveform of FIG. 7 has been transmitted in the state of having a frequency offset of +100 kHz is illustrated in FIG. 8.

Figure 8:
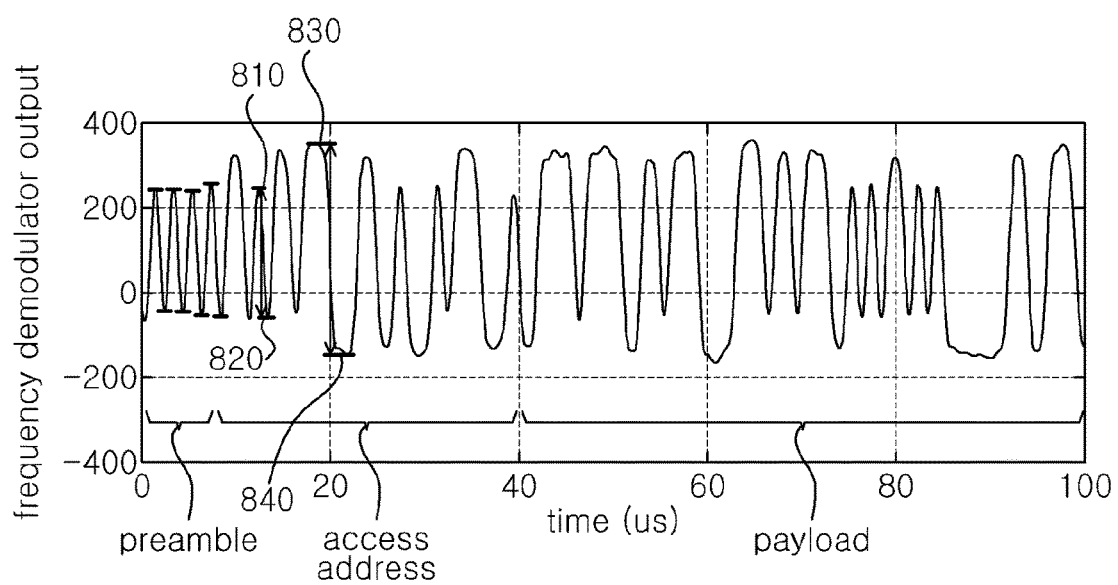
FIG. 8 shows an example of a waveform that is obtained after a Bluetooth Smart packet signal has passed through the frequency shift demodulator of a receiver in an environment in which noise is not present and a frequency offset of +100 kHz is present.

FIG. 8 shows an example of a waveform that is obtained after a Bluetooth Smart packet signal has passed through the frequency shift demodulator of a receiver in an environment in which noise is not present and a frequency offset of +100 kHz is present.

Referring to FIG. 8, there is shown an example in which a group of minimum and maximum frequency shifts, for which the estimation of a "minimum-maximum average value" can be performed using the training bit patterns "1010b" and "0101b," occurs four times during an interval of 8+2 μs including a preamble and an initial access address interval.

A "training bit pattern" is a combination of bit streams that have complementary shifts and the same length. Examples of training bit patterns appearing in an access address interval are a combination 1 of a symbol 810 representative of a maximum frequency shift and a symbol 820 representative of a minimum frequency shift, and a combination 2 of a symbol 830 representative of a maximum frequency shift and a symbol 840 representative of a minimum frequency shift. In this case, the symbol 810 and the symbol 830 are maximum frequency shift symbols located between minimum frequency shift symbols, and the symbol 820 and the symbol 840 are minimum frequency shift symbols located between maximum frequency shift symbols.

The symbol 810 and the symbol 820 correspond to the second bit "1" and the third bit "0" included in "0101b" in the manner of being complementary to the training bit pattern of the preamble interval.

The symbol 830 and the symbol 840 correspond to the second bit "1" and the fifth bit "0" included in the long training bit pattern "111000b". White noise has the characteristic in which the average values thereof converge to zero as the number of samples increases. That is, as calculation time increases, the magnitude of noise decreases due to a noise averaging effect. Accordingly, when offset is obtained and calibrated using the average value of four successive estimations, the accuracy of the demodulation of an access address and a protocol data unit that are received thereafter can be improved.

In this case, when a plurality of training bit patterns is recognized within an adjacent predetermined first time interval, frequency offset obtained from these training bit patterns may be recognized as an effective error metric, and may be then applied. When a plurality of training bit patterns have been recognized, the tendency of changes in offset over time may be tracked by applying a statistic technique, such as a technique using the average of error metrics obtained from respective training bit patterns, a sliding moving average technique, a weighted moving average technique or the like, may calculate the representative value of the offset by predicting the tendency of changes in offset, and then may compensate for the offset of a received signal.

The training bit patterns recognized within the first time interval have temporal adjacency. There is possibility that these training bit patterns have been influenced by the same error factor. Accordingly, the tendency of changes in offset may be tracked and predicted using the training bit patterns recognized within the first time interval. The offset tracked and predicted as described above may be incorporated into a received signal within a second time interval. The second time interval may be longer than the first time interval, and may have a finite length.

Figure 9:
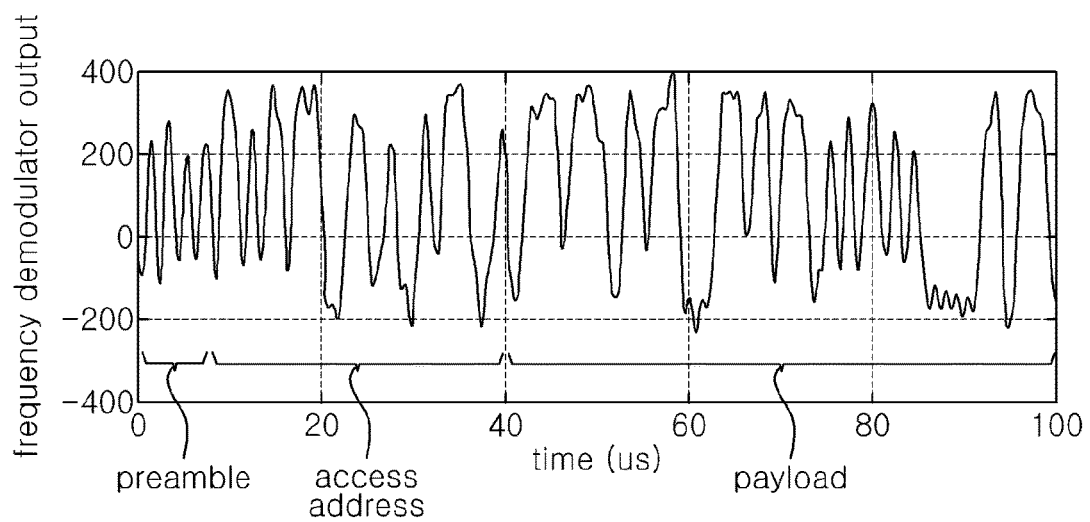
FIG. 9 shows an example of a waveform that is obtained after a Bluetooth Smart packet signal has passed through the frequency demodulator of a receiver in an environment in which a signal to noise power ratio is 15 dB and a frequency offset of +100 kHz is present.

FIG. 9 shows an example of a waveform that is obtained after a Bluetooth Smart packet signal has passed through the frequency demodulator of a receiver in an environment in which a signal to noise power ratio is 15 dB and a frequency offset of +100 kHz is present.

FIG. 9 shows the waveform of a received signal that is more similar to reality than the waveform of FIG. 8 by taking into account signal to noise power ratio.

Since Bluetooth Smart prioritizes costs and low power, it eases the level of analog circuit design specifications. It allows frequency drift within the maximum range of +/−50 kHz in a packet. Referring back to FIG. 5, the offset estimator 580 of the receiving device does not terminate a corresponding operation after accurately estimating initial frequency offset by using the preamble, but selects and updates effective carrier offset by using a training bit pattern discriminator also in the access address and protocol data unit intervals, thereby accurately tracking and effectively removing a flow in which offset changes slow within the packet.

Figure 10:
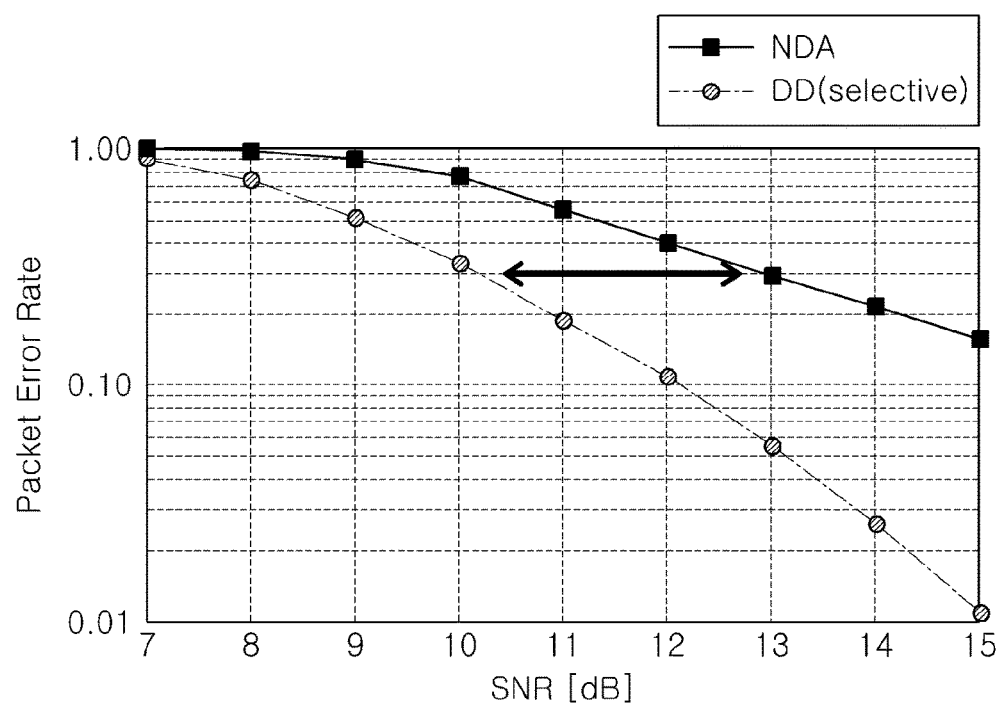
FIG. 10 shows the comparisons between the performance of the conventional NDA prediction technique and the performance of the proposed technique in an environment in which the initial frequency offset of a dirty transmitter and frequency drift defined in the Bluetooth Smart standard are present.

FIG. 10 shows the comparisons between the performance of the conventional NDA prediction technique and the performance of the proposed technique in an environment in which the initial frequency offset of a dirty transmitter and frequency drift defined in the Bluetooth Smart standard are present.

Referring to FIG. 10, it can be seen that in order to achieve the same packet error rate (PER), the frequency offset estimation of the conventional NDA prediction method must maintain an SNR of 13 dB while it is sufficient if the frequency offset estimation of the selective bit stream decision-oriented technique of the present invention maintains an SNR of 10.3 dB, thereby achieving the improvement of performance corresponding to about 2.7 dB.

Figure 12:
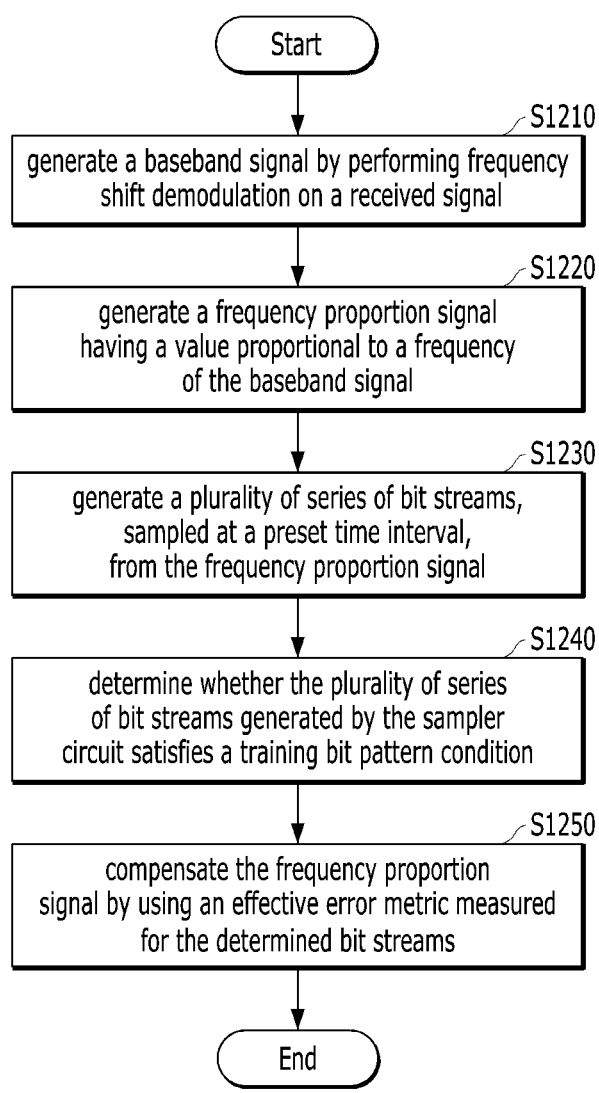
FIG. 12 is an operation flowchart showing a Bluetooth signal receiving method according to another embodiment of the present invention.

FIG. 12 is an operation flowchart showing a Bluetooth signal receiving method according to another embodiment of the present invention.

Referring to FIG. 12, the Bluetooth signal receiving method includes step S1210 of generating a baseband signal by performing frequency shift demodulation on a received signal.

The Bluetooth signal receiving method further includes step S1220 of generating a frequency proportion signal having a value proportional to the frequency of the baseband signal. In this case, the frequency proportion signal may be a signal indicative of the degree of being shifted from a carrier center frequency in + and − directions.

The Bluetooth signal receiving method may further include step S1230 of generating a plurality of series of bit streams, sampled at a preset time interval, from the frequency proportion signal. In this case, the preset time interval is a 1-symbol interval, and bit values may be determined using the signs of the frequency proportion signal.

The Bluetooth signal receiving method further includes step S1240 of determining whether a series of bit streams satisfy a training bit pattern condition. The training bit pattern condition may be adapted to select only a bit stream in which a negative direction frequency shift and a positive direction frequency shift are distributed to be complementary to each other from among a plurality of series of bit streams.

The training bit pattern condition may be set by applying the selective bit stream decision-directed technique.

The Bluetooth signal receiving method further includes step S1250 of measuring an error metric for the series of bit streams determined to satisfy the training bit pattern condition and compensating the frequency proportion signal by using the measured error metric as an effective error metric. The error metric may be obtained by applying the minimum-maximum average technique to the determined series of bit streams. To obtain the error metric, a distinguished series of bit streams may be accumulated up to a preset number, and may then be stored in memory. It may be determined whether the distinguished series of bit streams accumulated up to a preset number and then stored satisfy the training bit pattern condition. In this case, when a significant bit stream can be recognized, for example, within a 3-symbol interval in accordance with the length of a Gaussian filter, the maximum length of a pattern corresponding to a significant training bit pattern condition is 6, and thus the memory can store a maximum of 6 bit patterns. Alternatively, to determine whether a significant bit stream is complementary to a previous bit stream, 7 or 8 bit patterns may be stored.

The present invention is configured to define a "training bit pattern" and propose the "selective bit stream decision-oriented" technique in the Bluetooth Smart packet standard in order to perform carrier acquisition and tracking, and thus an ineffective error metric is discarded and an effective error metric is selectively incorporated into offset estimation, thereby reducing jitter and training time. The preamble defined in the Bluetooth Smart standard is configured in a pattern considerably appropriate for the present invention and continuous update can be performed in access address and protocol data unit intervals, so that frequency drift allowed in the Bluetooth Smart standard can be effectively removed and a noise averaging effect can be achieved, thereby presenting a method appropriate for the implementation of a high-sensitivity receiver.

The Bluetooth signal receiving method according to the embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

According to the present invention, the carrier offset recoverers of Bluetooth Classic and Bluetooth Smart are implemented using a "selective bit stream decision-directed" technique, and thus a method for selecting an effective error metric and an ineffective error metric and performing acquisition and tracking is proposed, thereby providing the effect of overcoming the disadvantages of high jitter and a long training time that the conventional NDA prediction technique has in packet communication.

According to the present invention, the combination of the bit stream of a preamble and the first bit of an access address defined in the Bluetooth Smart standard is transmitted in a form in which the "training bit pattern" is repeated three times and is considerably suitable for the proposed technique, and thus three repeated measurements can be made compared to a single estimation to which the NDA prediction technique is limited, thereby providing the effect of achieving the improvement of acquisition performance corresponding to 4.8 dB resulting from a noise averaging effect.

According to the present invention, a effective error metric is selected and used for the tracking of carrier offset, and thus a low-magnitude jitter characteristic is achieved, thereby providing the effect of exhibiting significantly desirable tracking performance even when a complex loop filter is not implemented and the effect of effectively removing frequency drift defined in the Bluetooth Smart standard.

While the present invention has been described in conjunction with specific details, such as specific elements, and limited embodiments and diagrams, above, these are provided merely to help an overall understanding of the present invention. The present invention is not limited to these embodiments, and various modifications and variations can be made based on the foregoing description by those having ordinary knowledge in the art to which the present invention pertains.

Therefore, the technical spirit of the present invention should not be determined based only on the described embodiments, and not only the following claims but also all equivalents to the claims and equivalent modifications should be construed as falling within the scope of the spirit of the present invention.

What is claimed is:

1. A Bluetooth signal receiving device comprising:
a frequency shift demodulator circuit configured to:
generate a baseband signal by performing frequency shift demodulation on a received signal; and
generate a frequency proportion signal having a value proportional to a frequency of the baseband signal;
a digital sampler circuit configured to generate a plurality of series of bit streams, sampled in a digital domain at a preset time interval, from the frequency proportion signal, wherein at least one of the received signal, the baseband signal, and the frequency proportion signal is converted from an analog domain to the digital domain;
a training bit pattern discriminator circuit configured to determine whether the plurality of series of bit streams generated by the digital sampler circuit satisfies a training bit pattern condition; and
a frequency offset compensation circuit configured to compensate the frequency proportion signal by using a measured error metric as an effective error metric when the plurality of series of bit streams satisfies the training bit pattern condition.

2. The Bluetooth signal receiving device of claim 1, wherein the training bit pattern condition is set by applying a selective bit stream decision-directed technique.

3. The Bluetooth signal receiving device of claim 1, wherein the training bit pattern condition is adapted to select a bit stream having a distribution in which a negative direction frequency shift and a positive direction frequency shift are complementary to each other from among the plurality of series of bit streams.

4. The Bluetooth signal receiving device of claim 1, wherein the frequency offset compensation circuit is further configured to measure the error metric by applying a minimum-maximum average technique to the plurality of series of bit streams.

5. The Bluetooth signal receiving device of claim 4, wherein the frequency offset compensation circuit is further configured to:

select a representative frequency shift when frequency shifts having an identical polarity appear successively in the plurality of series of bit streams; and measure the error metric by applying the minimum-maximum average technique to the representative frequency shift.

6. The Bluetooth signal receiving device of claim 1, wherein the frequency offset compensation circuit is further configured to, when the plurality of series of bit streams satisfies the training bit pattern condition a plurality of times within a first time interval, calculate a first representative value of a plurality of effective error metrics within the first time interval and compensate the frequency proportion signal by using the first representative value.

7. The Bluetooth signal receiving device of claim 1, wherein the training bit pattern discriminator circuit is further configured to determine whether the plurality of series of bit streams satisfies the training bit pattern condition not only in a preamble interval of Bluetooth but also in an access address or protocol data unit interval thereof.

8. The Bluetooth signal receiving device of claim 1, further comprising memory configured to:
 accumulate the plurality of series of bit streams, generated by the sampler, up to a preset number; and
 store the accumulated plurality of series of bit streams;
 wherein the training bit pattern discriminator circuit is further configured to determine whether the plurality of series of bit streams accumulated up to the preset number and stored in the memory satisfies the training bit pattern condition.

9. The Bluetooth signal receiving device of claim 1, wherein when the received signal is a signal transmitted through a Gaussian filter, a maximum length of the training bit pattern condition is determined in accordance with a bandwidth or length of the Gaussian filter.

10. A Bluetooth signal receiving method comprising:
 generating a baseband signal by performing frequency shift demodulation on a received signal;
 generating a frequency proportion signal having a value proportional to a frequency of the baseband signal;
 generating a plurality of series of bit streams, sampled in a digital domain at a preset time interval, from the frequency proportion signal, wherein at least one of the received signal, the baseband signal, and the frequency proportion signal is converted from an analog domain to the digital domain;
 determining whether the plurality of series of bit streams generated in the digital domain satisfies a training bit pattern condition; and
 compensating the frequency proportion signal by using a measured error metric as an effective error metric when the plurality of series of bit streams satisfies the training bit pattern condition.

11. The Bluetooth signal receiving method of claim 10, wherein the training bit pattern condition is set by applying a selective bit stream decision-directed technique.

12. The Bluetooth signal receiving method of claim 10, wherein the training bit pattern condition has a distribution in which a negative direction frequency shift and a positive direction frequency shift are complementary to each other within the plurality of series of bit streams.

13. The Bluetooth signal receiving method of claim 10, further comprising measuring the error metric by applying a minimum-maximum average technique to the plurality of series of bit streams.

14. The Bluetooth signal receiving method of claim 10, wherein the determining comprises determining whether the plurality of series of bit streams satisfies the training bit pattern condition not only in a preamble interval of Bluetooth but also in an access address or protocol data unit interval.

15. The Bluetooth signal receiving method of claim 10, further comprising accumulating the plurality of series of bit streams, generated by the sampler, up to a preset number, and storing the accumulated plurality of series of bit streams;
 wherein the determining comprises determining whether the plurality of series of bit streams accumulated up to the preset number and then stored satisfies the training bit pattern condition.

* * * * *